United States Patent von Rosenberg, Jr. et al.

[11] 4,092,405
[45] May 30, 1978

[54] SEPARATION OF DEUTERIUM FROM HYDROGEN

[75] Inventors: Charles W. von Rosenberg, Jr.; James J. Ewing, both of Belmont, Mass.; Robert E. Center, Bellevue, Wash.; Hao-Lin Chen, Walnut Creek, Calif.

[73] Assignee: Avco Everett Research Laboratory, Inc., Everett, Mass.

[21] Appl. No.: 691,473

[22] Filed: Jun. 1, 1976

[51] Int. Cl.$^2$ .......................... C01B 5/02; C01B 1/00; B01K 1/00
[52] U.S. Cl. .................................. 423/580; 204/164; 204/157.1 R; 204/157.1 H; 423/648 A
[58] Field of Search ......... 204/164, 157.1 R, 157.1 H, 204/DIG. 11; 423/648 A, 580

[56] References Cited

U.S. PATENT DOCUMENTS 3,772,172  11/1973  Zhagatspanian et al. .... 204/157.1 H
3,883,413  5/1975  Douglas-Hamilton .............. 204/176

FOREIGN PATENT DOCUMENTS 919,876  2/1963  United Kingdom ............ 423/648 A

OTHER PUBLICATIONS

Tiffany et al., Science, vol. 157, pp. 40–43, 7/67.

Primary Examiner—F.C. Edmundson
Attorney, Agent, or Firm—Charles M. Hogan; Melvin E. Frederick

[57] ABSTRACT

Method of and apparatus for non-equilibrium chemical kinetic separation of deuterium from hydrogen are described wherein hydrogen with its normal abundance of deuterium and an appropriate reactant, bromine, are supplied to a deuterium reaction vessel wherein they are vibrationally excited by, for example, being exposed to a volumetrically scalable ionizing-sustainer electrical discharge effective to provide vibrational excitation of the $H_2$ and HD following which selective intermolecular vibration-vibration energy pumping occurs giving conditions effective to produce an HBr/DBr product mixture. The ionizing-sustainer discharge is effective to generate vibrational excitation from which follows chemical reactions that produce DBr and HBr at such relative rates that the mixture is enhanced in deuterium content relative to said content of the entering hydrogen stream. For the production of heavy water, the DBr and HBr are then dissolved in water. This water is then reacted with oxygen to chemically separate the bromine and the bromine is removed to leave water enriched in deuterium. Additional DBr/HBr product mixture is then dissolved in this deuterium enriched water and the process repeated to produce water having the deuterium content of the product DBr/HBr.

16 Claims, 4 Drawing Figures

SEPARATION OF DEUTERIUM FROM HYDROGEN

BACKGROUND OF THE INVENTION

This invention relates to the separation of the isotopes of hydrogen from a mixture thereof, and is directed particularly to the separation of deuterium from a gaseous mixture comprising essentially protium, hereinafter called "hydrogen" and deuterium and the production of heavy water with the deuterium.

The advent of atomic energy processes on a commercial scale has created, and will in the future continue to create, large demands for relatively pure single isotopes. Many methods have been proposed and employed in the prior art for the separation of isotopic mixtures and/or enrichment thereof. Such processes include fractional distillation, gaseous diffusion, electromagnetic methods, mass spectrographic methods, chemical isotopic exchange reactions, selective electrolysis, and the like. These prior art processes are generally very expensive in commercial operations and require large and expensive outlays of equipment. The separation factors for most of the existing prior art processes are very low, even for the hydrogen isotopes and a great number of stages must be employed to achieve significant separations. Furthermore, the separation or enrichment of isotopes by the foregoing methods usually involves a large hold-up of materials within the process.

Heavy water is water in which hydrogen of mass number one is replaced by its isotope deuterium of mass number two. Heavy water is employed as a moderator in nuclear reactors using slightly enriched uranium as a fuel. It is also used as a combined moderator-coolant in reactors using natural uranium as a fuel. The function of a moderator in a reactor is to slow down the neutrons so as to increase the probability that they will be absorbed by the uranium atoms thus causing them to fission. The so-called CANDU (Canadian Deuterium Uranium) reactor is an example of those using heavy water and natural uranium.

Deuterium occurs in natural water, hydrogen, methane, etc. in a ratio of about 100–150 parts per million (D/H molecular ratio). The ratio in hydrogen varies somewhat with the source of the hydrogen. Because deuterium is an isotope of hydrogen, the two cannot be separated by ordinary chemical methods. There are, however, a number of prior art processes by which deuterium in the form of heavy water can be separated from hydrogen or from ordinary or natural water. These include distillation, electrolysis, diffusion, normal kinetic isotope effect and various chemical exchange processes. All of these are expensive, requiring either large capital expenditures or large amounts of energy, or both.

Of the many processes available, the process used most to produce heavy water is a dual temperature chemical exchange process, the so-called GS or sulfide process. In this process, natural water is concentrated to about 10% or more heavy water by chemical exchange utilizing hydrogen sulfide. The water is then concentrated further by suitable well-known means such as vacuum distillation to yield a reactor grade product (approximately $\geq$ 99.8 mol percent heavy water).

The GS process takes advantage of the fact that in the process or reaction and $H_2S$, deuterium tends to concentrate in the liquid component at the lower temperature and in the gas at the higher temperature. By causing the reaction to go first in one direction and then in the other and drawing off the enriched gas and liquid streams at appropriate points and passing them on to further steps, natural water is enriched to the point that it becomes economic to concentrate it further by other means. It is by this process that—excluding the production of China and the USSR—approximately 90% of the present world supply of heavy water is produced.

Although the advantages of the sulfide process have caused it to be selected and preferred over all other prior art processes, there is a major disadvantage of the sulfide process in that large quantities of a toxic gas are used. Further, since it is used, not only the piping and vessels must be fabricated to at least substantially the same standards as apply to nuclear power plants, but also a large exclusionary area around the plant is necessary.

SUMMARY OF THE INVENTION

In accordance with the invention, gaseous hydrogen sufficiently free of deleterious impurities is combined with an appropriate reactant, bromine, and quantum mechanically pumped in a reactor to produce a selective reaction wherein a product mixture HBr/DBr is formed which is isotopically enriched in D relative to H. Selective reaction is promoted by utilization of vibrationally enhanced reactions under conditions where HD is selectively enhanced relative to $H_2$.

The product mixture HBr/DBr is then dissolved in water and thereafter reacted with oxygen to form bromine ($Br_2$) and water enriched in deuterium. This enriched water is then used to dissolve additional HBr/DBr until the ratio of D to H reaches steady state at the level of enrichment of the HBr/DBr leaving the reactor. At this point, a portion of this circulating enriched water is withdrawn and enriched further in deuterium by any other suitable method such as distillation. The preceding may be continued until heavy water (99.8% $D_2O$) is produced.

It is an object of the invention to overcome the earlier noted disadvantages of the prior art processes for the separation of deuterium and/or production of heavy water.

It is another object of the invention to provide improved systems for reducing the cost factors in the separation of deuterium and/or production of heavy water.

It is another object of the invention to provide an improved system and apparatus for separating deuterium and/or production of heavy water that is more efficient and less expensive to operate than prior art systems.

It is a further object of the invention to separate deuterium and/or provide heavy water by non-equilibrium chemical kinetic processing of gaseous hydrogen.

These and other objects and features of the present invention will be apparent from the specific description of embodiments of the invention taken in conjunction with the figures described below.

DESCRIPTION OF EMBODIMENTS OF THE INVENTION

Figure 1:
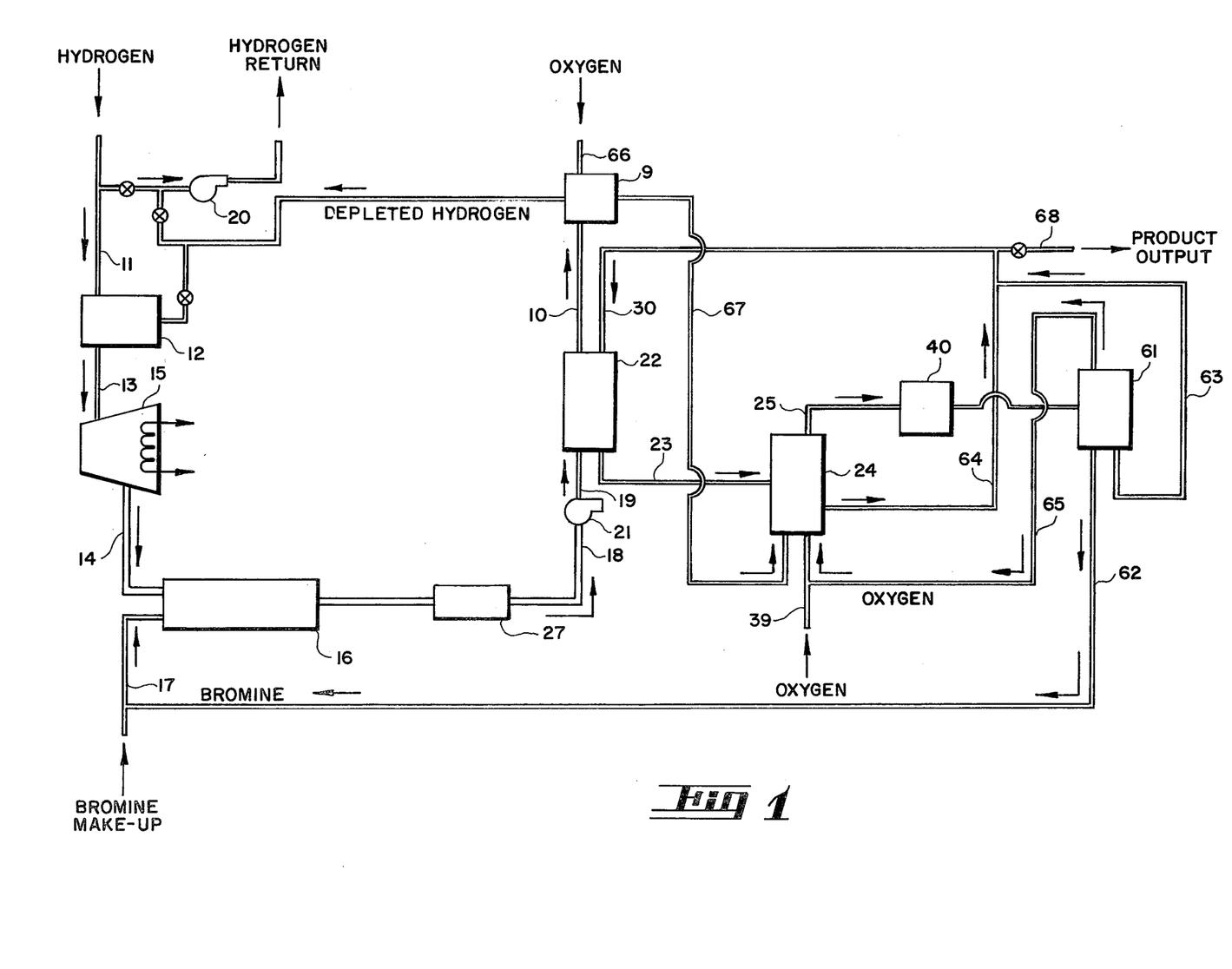
FIG. 1 is a diagram illustrating apparatus for carrying out the invention.

The features of the invention are typically illustrated in FIG. 1 in connection with the separation of deuterium from gaseous hydrogen using bromine as a reactant and the consequent concentration of deuterium to produce heavy water (99.8% $D_2O$).

Gaseous hydrogen from any considerable and suitable source (not shown) is introduced into the system through line 11. The hydrogen may, for example, be supplied as the output product or be an intermediate stream of a coal gassification, ammonia, refinery or other plant, or be generated by electrolysis or the like. Where the hydrogen supplied contains deleterious or undesirable impurities which have not previously been removed, line 11 is connected to conventional gas cleaning apparatus 12 such as a conventional absorption gas cleaner for removing the undesired impurities.

The amount and kind of impurities will, of course, be a function of the source of the hydrogen. Such impurities may typically comprise a combination of methane, water, nitrogen, oxygen, carbon dioxide, carbon monoxide, ethane and the like. Such of the impurities as would adversely effect, for example, the vibrational energy pumping, attack electrons in the discharge, vibrationally relax the hydrogen, or react with the bromine or vibrationally excited hydrogen are removed to a sufficiently low level in a conventional manner in the cleaning apparatus 12. Any of the conventional cleaning methods taken singly or in combination, such as pressure swing absorbtion, condensation, dissolving, and the like, may be used.

After cleaning where necessary, the hydrogen is supplied at a predetermined velocity, volume, flow rate, temperature and pressure via lines 13 and 14 and conventional compressor and heat exchange means 15 to the deuterium reactor 16. As more fully described hereinafter, the velocity, volume, flow rate, pressure and temperature of the hydrogen supplied to the deuterium reactor 16 is selected to provide the reaction rates desired. Typically, the hydrogen at the outlet of the cleaning apparatus may be of the order of 15 atmospheres and 450° K. Where a nozzle is utilized, as for example, as the inlet to reactor 16, the hydrogen may typically exit therefrom at about 1 atmosphere and 210° K.

Gaseous bromine ($Br_2$) from any suitable source in the required amount is supplied via line 17 to the deuterium reactor 16 where it is mixed with the incoming hydrogen. Alternately, the bromine may be premixed with the hydrogen. In operation, the bromine is preferably recovered and recycled.

Where dissociation in deuterium reactor 16 is not sufficient, the deuterium reactor 16 may comprise means for dissociating the bromine into Br atoms. Further, the dissociation may occur simultaneously or distinctly from an electron beam sustained discharge more fully described hereinafter.

Thus, in accordance with the invention, HD is caused to selectively react with Br to form a product mixture HBr/DBr which is isotopically enriched in D relative to H and which can easily be separated from the bulk $H_2$ which originally contained the HD. The desired reaction may be promoted by utilization of vibrationally enhanced reactions under conditions where Teare/Treanor V-V non-equilibrium pumping selectively enhances the excitation of HD relative to $H_2$. For a more complete discussion of Teare/Treanor pumping referred to above, reference is made to "Observations of Vibration-Vibration Energy Pumping Between Diatomic Molecules" by J. D. Teare, R. L. Taylor and C. W. vonRosenberg, Jr., Nature, Volume 225, Pgs. 240-243, published Jan. 17, 1970 and "Vibrational Relaxation of a Harmonic Oscillator with Exchange-Dominated Collisions" by C. E. Treanor, J. W. Rich and G. Rehm, Journal of Chemical Physics, Volume 48, No. 4, Pgs. 1798-1807, published Feb. 15, 1968.

The output of the deuterium reactor 16 comprises $H_2$, HBr, DBr and $Br_2$ and via lines 18 and 19 and compressor 21 is supplied to reactor or absorption tower 22 where the HBr and DBr are caused to dissolve in water and the hydrogen is separated.

Where the stream flow through the nozzle at the inlet of the reactor 16 is supersonic, shock recovery and cooler means 27 may be provided upstream of compressor 21. Typically, the existing output of reactor 16 may be expected to be at about 1 atmosphere and 300° K and the hydrogen at the output of the shock recovery means may be expected to be at about 7.5 atmospheres with the compressor 21 compressing the stream to about 15 atmospheres. Absorption tower 22 may be comprised of any normal gas-liquid contacting means. Water passes down the tower in counter-current relationship to the gas rising and passing therethrough and HBr and DBr is absorbed from the gas into solution in the water.

The hydrogen separated in reactor 22 and containing some water vapor is supplied via line 10 to a dryer 9 such as, for example, an absorption gas dryer which removes the water vapor. The hydrogen, dried to a dew point of, for example, about 220° K, thereafter may be returned to the source. Impurities collected in the gas cleaner 12 may, if desired, be released in a regenerative cycle and mixed with the dried hydrogen (not shown) where the dried hydrogen is not reintroduced into the system.

Where water is an output of dryer 9, it may be supplied via line 29 to the water input line 30 of tower 22. The water output of tower 22 is then supplied via line 23 to an oxidizer or stripping tower 24 where it is contacted with a rising stream of oxygen from line 39. As with tower 22, tower 24 may be comprised of conventional gas-liquid contacting hardware. In tower 24, the reactant bromide may be stripped into the gas phase from the solution flowing therethrough and together with the oxygen, removed from tower 24 via line 25. The stripped gaseous solution may then be removed from tower 24 and supplied via line 25 to a further reactor 40 designed to cause the reactions DBr + HBr + $O_2$ = HDO + $Br_2$ $2DBr + O_2 = D_2O + Br_2$
$2HBr + O_2 = H_2O + Br_2$ to occur. The product stream exiting from reactor 40 and containing $D_2O$, HDO, $H_2O$, $Br_2$ and excess $O_2$ may then be supplied to a conventional condenser 61 where the water and bromine are condensed and the bromine and water phases separated. The separated bromine, via line 62 is mixed with any required make-up bromine supplied to reactor 16 via line 17.

The water output phase from condenser 61, via line 63 is mixed with output water from tower 24 carried by line 64, where it may either be returned to tower 22 via line 30 or withdrawn from the system. The oxygen stream which passes through the condenser 61 is returned to tower 24 via line 65.

The water in dryer 9 may be stripped from the adsorbent in a regenerative cycle with oxygen supplied via line 66 from any suitable source. The resulting oxygen-water mixture may, via line 67, together with oxygen from condenser 61, be supplied to tower 24.

The product heavy water solution may be withdrawn via line 68 from the water recycle stream (lines 30, 63, 64) so as to maintain the inventory of water in that recycle system constant.

A volumetrically scalable electron beam device of the type here contemplated for purposes of description to form the basis for deuterium reactor 16 is described in U.S. Pat. No. 3,702,973 issued Nov. 14, 1972 entitled "Laser or Ozone Generator in Which a Broad Electron Beam with a Sustainer Field Produce a Large Area, Uniform Discharge" to Daugherty et al. This patent describes a structure and method for operating large devices capable of providing large volume uniform and controllable discharges useful for a number of different purposes, only one of which is as a laser. A spacially uniform controlled electric discharge is produced in the working region by introducing ionizing radiation (a broad electron beam) into the working region (an optical cavity for a laser) through a wall of the cavity to produce a substantially uniform predetermined density of secondary electrons in the selected gaseous medium by ionizing the medium and at the same time providing a sustainer electric field which is substantially uniform throughout the working region and which provides a predetermined and desired electron temperature which is calculated to increase the average energy of secondary electrons in the working region (produced by the electron beam) to achieve the result desired or necessary without substantially increasing the predetermined electron density in the region. This patent describes a method and structure for producing a uniform controlled discharge in a gaseous medium in a volumetrically scalable working region at up to atmospheric pressure and above. The sustainer field direction, the laser beam direction and the gas flow direction may be mutually orthogonal.

In operation, the ionizing electron beam is generated outside the laser cavity by an electron beam generator and there is a broad area uniform beam of sufficient cross section dimension to cover the relatively large working region of the device. A suitable structure for generating such a broad area uniform electron beam is described in U.S. Pat. No. 3,749,967 which issued July 31, 1973 entitled "Electron Beam Discharge Device" by Douglas-Hamilton et al. The beam is transmitted into the laser cavity through an electron window and into the working region bounded by the sustainer field.

In the high power electron discharge device such as described in the above-mentioned U.S. Pat. No. 3,702,973, output power or energy deposited in the gas is approximately proportional to input power to the sustainer section. The sustainer section includes an anode and a cathode with the gaseous working region in between and so the effective working region of the device is substantially defined by this anode and cathode. It is the discharge between the anode and the cathode, uniformly maintained, that vibrationally pumps the gas in or flowing through the working region and so provides the desired reaction and pumping effect. In the case of a laser, it produces the necessary population inversion, and in the present case here concerned, it produces the desired $H_2$/HD excitation allowing Teare/Treanor vibrational pumping of HD by $H_2$.

The ionizing electron beam is produced by the E-beam system which is an external electron accelerating device that generates a broad area electron beam projected through an electron window into the working region of the discharge. In the E-beam device, electrons emitted by a cathode are accelerated by anodes and so the energy of the electron entering the working region is determined by the accelerating anode voltage. Usually, the accelerating anode voltage is maintained constant and the voltage on a control grid located between the accelerating anodes and the cathode is varied. This grid controls the density of the electron beam that is injected into the sustainer working region of the laser. Very abrupt changes in output power can be achieved by abruptly changing the voltage on this control grid in the electron beam generator. Thus, the electron beam generator and the sustainer circuit operate in conjunction in a fashion similar to a tetrode vacuum tube to control output power of the device and/or energy deposited in the gas, and, hence, its effect on the working gas, that output power being controlled by a grid potential in the electron beam generator. Thus, both the electron beam and the sustainer discharge are available to produce the desired vibrational excitation of hydrogen and enable Teare/Treanor pumping to occur.

Figures 2, 3, 4:
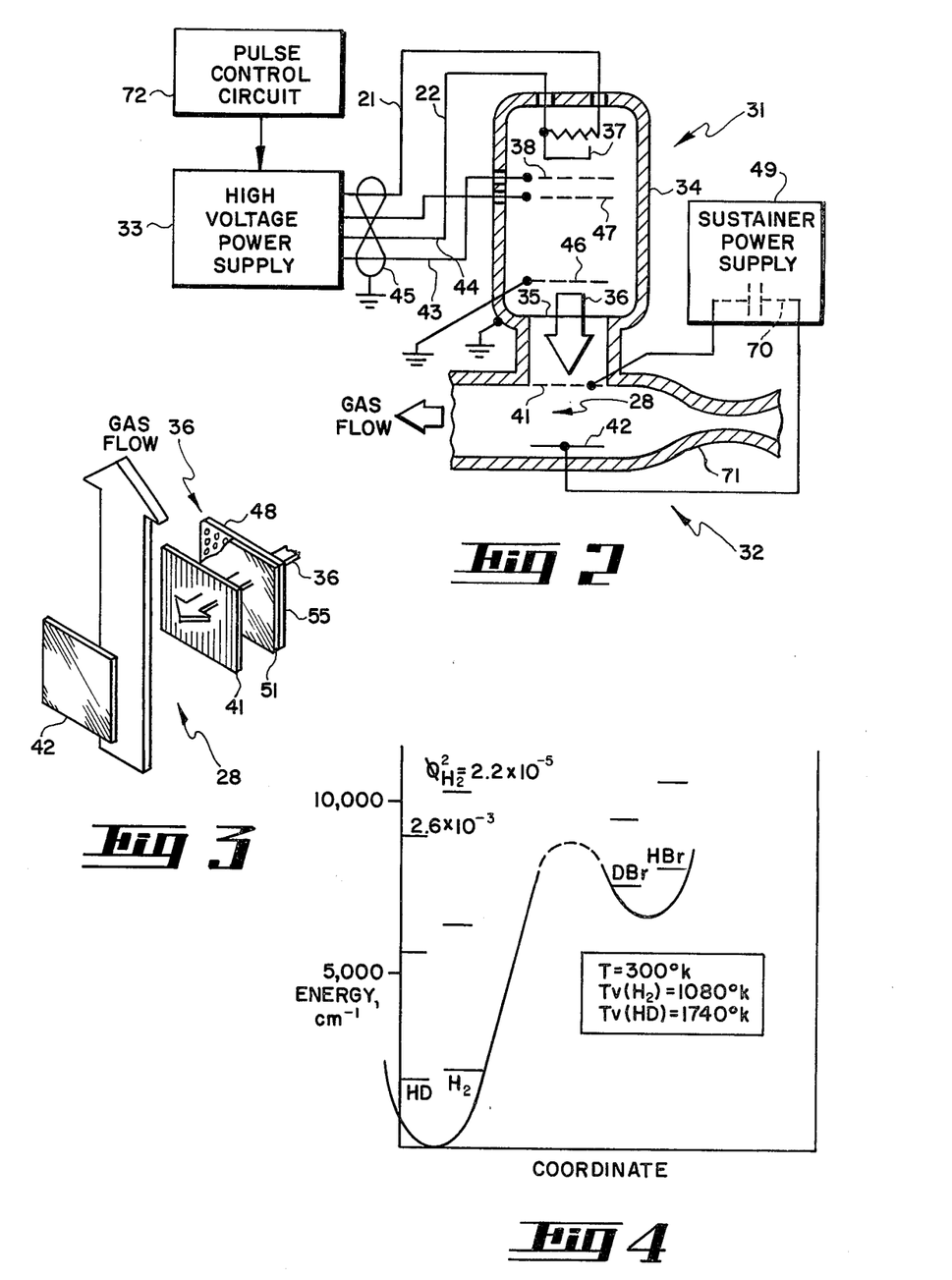
FIG. 2 is a diagram illustrating the structures of a typical deuterium reactor for carrying out the invention.
FIG. 3 is a perspective diagrammatic view illustrating the direction of electron generation, sustainer field, and gas flow in the working region of the deuterium reactor of FIG. 2.
FIG. 4 is a potential energy diagram illustrating the general relationship of the vibrational energy levels of $H_2$, HD, DBr and HBr and the energy barrier for the formation of DBr and HBr.

The diagram in FIG. 2 represents the E-beam generator 31, the sustainer circuit 32 and the working region 28, nozzle 71 and the high voltage power supply 33 which supplies power to the E-beam generator.

The E-beam generator 31, as briefly represented in FIG. 2, includes an envelope 34 having a vacuum barrier electron window 35 at one end, adapted to permit the electron beam 36 generated within the envelope to emerge from the window. Within the envelope are disposed a cathode 37, a control grid 38 and accelerating anodes 46 and 47. Voltage to the cathode 37 and control grid 38 is supplied from the E-beam high voltage power supply 33 via lines 44 and 43 contained in the shielded cable 45. Envelope 34 and the anode 46 are grounded, cathode 37 is negative with respect to ground and the voltage on anode 47 lies at some potential therebetween. Thus, the density of electrons which flow from the cathode and reach the accelerating field between the anodes 46 and 47 depends upon the voltage on the control grid 38. The electrons accelerated by the accelerating field between the anodes 46 and 47 penetrate the window 35 and emerge from that window as a broad area beam 36 of electrons of reasonably uniform energy, the density of this beam being determined by the voltage on control grid 38.

The broad electron beam drifts across the working region 28 which contains the working medium at the operating pressure of the working region. Thus, the beam emerges from the vacuum of envelope 34 into a region of substantial gas pressure and penetrates into the working region, denoted 28. This working region lies between the sustainer electrodes 41 and 42 which are spaced so that gas flow is between these electrodes.

As noted previously, after compression to about 15 atmospheres and a temperature of about 450° K (if not otherwise provided), the hydrogen may be expanded through a nozzle to about 1 atmosphere and a temperature of about 210° K. A useful range for the pressure and temperature is respectively about 0.1–0.2 atmospheres and about 70°–300° K. Such a nozzle 71 may comprise the inlet to the working region 28 as shown in FIG. 2. Further, while supersonic expansion through nozzle 71 is advantageous, it is to be noted that subsonic expansion is also contemplated. The velocity of the expansion used will be dependent on the operating parameters selected and/or various trade-offs made by the designer.

The sustainer electrodes 41 and 42 are provided with voltage from the sustainer power supply 49 such that a substantially fixed voltage differential is applied across these electrodes. Accordingly, the power to the sustainer electrodes depends upon the impedance therebetween as determined by the density of ions and electrons produced in the working region by the incident electron beam 36.

The voltage on the control grid 38 in the E-beam device may be controlled by a grid bias control circuit (not shown), located in the high voltage power supply 33. The cathode of the E-beam is negative with respect to ground at about 70 kv or higher. The cathode 37 may connect to the high voltage output of the 70 kv supply (not shown) in the high voltage power supply 33. The E-beam grid 38 may also be at about 70 kv negative, give or take the grid voltage which is determined by a grid control circuit. The cathode filament may be controlled by a filament control circuit (not shown) and accelerating anode 47 may be controlled by a control circuit (not shown), both in the high voltage power supply 33. Thus the appropriate grid, cathode, cathode filament and anode accelerating control circuits and the 70 kv power supply may be all contained within the enclosure of the high voltage power supply 33.

For control purposes, the E-beam control grid voltage may be telemetered to the grid control circuit rather than transmitted to it via hard copper wires. For this purpose, an isolation transformer (not shown) may comprise the link between the 70 kv voltage level inside the power supply enclosure and the E-beam generator.

The coordinates associated with the electron beam, the direction of gas flow and the working region are illustrated in FIG. 3. The gaseous medium comprising hydrogen and bromine flows through the device in the direction identified as gas flow. This mixture is directed through the working region 28. Additional details of the reactor, sustainer and E-beam generator are found in the patents mentioned herein.

As described also in U.S. Pat. No. 3,702,973, the inside of the E-beam generator envelope 34 is evacuated so that the broad area electron beam 36 can be formed and controlled therein. This beam is launched towards the reticulated conducting plate 55 which is part of the window 36 in the envelope. The plate 55 may be made of stainless steel or the like and is covered with a thin sheet of a material or diaphragm 51 which possesses adequate structural stability to withstand the pressure differential between the inside of the envelope and the working region 28 and yet transmits the electrons without absorbing an excessive portion of their energy which would cause a failure of the diaphragm.

The broad area beam 36 emerging from the window 35 into the working region 28 passes through a reticulated cathode plate 41 which may be constructed of wire mesh, and into the working region 28. In the working region, electron energy is maintained by the sustainer electric field between the oppositely disposed anode and cathode plates 41 and 42, respectively, which are coupled to the sustainer power supply 49.

The ionizing electron beam thus provided, penetrating into the working region provides a source of secondary electrons in the working region at a very low electron temperature and increases the efficiency by the electric discharge as is more fully explained in the above-mentioned U.S. Pat. No. 3,702,973.

The present invention is based on the unique and unobvious reactions and processes that occur when a mixture of hydrogen and a small amount of gaseous bromine is vibrationally excited, by for example, being exposed to an electron beam-sustainer discharge in accordance with the invention. It is, of course, well known that hydrogen and bromine will normally react very slowly at room temperature and some data suggests that this reaction will go more quickly when the hydrogen is excited. However, little is known regarding details of the reaction of hydrogen, when vibrationally excited, with bromine. Another problem is that very little is known regarding the possibility of achieving preferential vibrational excitation of HD over that of $H_2$ that is practically useful as distinguished from theoretically or experimentally possible on a laboratory scale. The practical achievement of this is possible in accordance with the present invention.

Broadly, the introduction of the mixture of hydrogen and bromine into the deuterium reactor results in not only a reaction producing DBr and HBr, but one in which the DBr is produced at an enhanced rate relative to HBr. This is illustrated in FIG. 4 which is a potential energy diagram for $H_2$ and HD. For purposes of illustration, it is assumed that the relative populations are $\phi H_2 = 2.2 \times 10^{-5}$, $\phi HD = 2.6 \times 10^{-3}$ where, for example $\phi H_2$ is defined as the concentration of $H_2$ in vibrational level V=2 divided by the concentration of $H_2$ in level V=0. These conditions of excitation correspond to vibrational temperatures of $H_2$ and HD respectively of $T_v(H_2) = 1080°$ K, and $T_v(HD) = 1740°$ K, which are consistent with the Teare/Treanor pumping formula if the translational temperature is T = 300° K.

The energy barrier for the required reaction is suggested by the broken line portion of the potential energy curve. The short lines represent the vibrational energy levels of $H_2$, HD, DBr and HBr. Where both HD($v=2$) and $H_2(v=2)$ have sufficient energy to react with Br atoms, the relative rate of consumption of Br atoms by $H_2$ vs. HD may be calculated to be about 28. Accordingly, the relative rate of formation of HBr to DBr may be calculated to be about 57 to 1 and to require of the order of about 1% $Br_2$. A useful range for bromine is about 0.1–1.0% of flow through the working region of reaction zone. This ratio may be shown to represent a deuterium enrichment of about $(1/57) \div 150$ ppm = 117.

It can be shown from the Teare/Treanor formulation that $\phi HD/\phi H_2 = \exp(\Delta E/T)$ where $\Delta E = (E_{HD(2)} - E_{H_2(2)})$ and $E_{HD(2)}$ is the energy of HD in vibrational level V=2 relative to HD in V=0, and similarly for $E_{H_2(2)}$, and T is the translational temperature. Thus, it may now be seen that the relative enhancement in HD vibrational energy relative to $H_2$ depends only on the translational temperature and not the vibrational temperature. Accordingly, in accordance with the present invention preferably via the employment of electron beam-sustainer discharge pumping, vibrationally excited $H_2$/HD is made the major path for $H_2$/HD reaction with bromine (vs. translational or rotational excitation) and the overall time scale is made as small as reasonably possible to provide the maximum reasonable production rate. While the use of other conventional means are not excluded, the electron beam-sustainer discharge can provide dissociation of some of the gaseous bromine and/or hydrogen to form atoms to start the reaction.

Where the [BR]/[Br$_2$] ratio is very small, the presence of impurities (preferably less than about one hundred parts per million for the hydrogen and less than about one percent for the bromine) must be considered and where the ratio is large, recombination as a loss mechanism must be considered. It may also be noted here that the vibration-vibration (V—V) exchange of the sort $H_2$ ($v=1$) + HD ($v=0$) > $H_2(0)$ + HD(1) should be made fast compared to vibration-translation (V-T) exchange of the sort $H_2(1)$ + M → $H_2(0)$ + M or the overall time scale of the net $H_2$/HD + Br$_2$ chemistry.

Wall reaction, an undesirable effect, may be reduced if not avoided by making the volume to surface ratio of the working region sufficiently large. A simple criterion to obtain a characteristic dimension l can be based on making the diffusion time to a wall long compared to the characteristic residence time.

Two important scaling parameters are the pressure and degree of vibrational excitation of the mixture in the working region. Once values for these parameters are selected, the various physical restraints fix most of the other important parameters. Further, in terms of economic operation, it is desirable to operate at higher pressures to reduce the physical size of the deuterium reactor for a given mass flux.

The generation of the product mixture HBr/DBr, isotopically enriched in D relative to H in accordance with the invention, may be enhanced by increasing in the electrical discharge in the deuterium reactor the ratio of the current carried by electrons relative to that carried by ions. The electron current is the component of the current flow in the working region best capable of producing the desired product mixture. Consequently, in accordance with the invention, increasing the ratio of the electron density to the ion density in the working region increases the efficiency with which the product mixture is produced.

The energy imparted to the vibrational excitation of the incoming feed stream by electrons is greater than that imparted by ions at the beginning of the discharge. Accordingly, the product mixture will be produced with high efficiency at the beginning of the discharge. However, after a brief time, the ion current will exceed the electron current and it is for this reason that the sustainer field should go to zero or effectively disappear so that no further energy is inefficiently imparted to incoming feed stream by ion current flow. After the sustainer field disappears or effectively disappears, and a short interval provided to permit the ions time for mutual neutralization and, hence, disappearance, another pulse of high energy electrons may be applied to the incoming gas stream, the sustainer field increased or applied as may be appropriate, and the process repeated. The net rate at which the product mixture can be produced by this method is higher than might otherwise be possible.

For the above-described mode of operation, the electrodes 41 and 42 may be coupled to a capacitor 70 in the sustainer power supply 49. The capacitor 70 may form a part of the sustainer power supply 49 and be charged thereby at a suitable rate to establish the required electric sustainer field across the working region. When the incoming feed stream flowing through the sustainer field is irradiated with an electron beam pulse, the feed stream within the working region becomes conductive and this discharges the sustainer capacitor. After the pulsed electron beam energy is removed by terminating the pulse, the feed stream again becomes nonconductive and the sustainer capacitor will again take a charge. The cycle is repeated at the beginning of the next electron beam pulse and the ions recombine and/or disappear during the time the sustainer capacitor is being recharged. For this mode of operation, the high voltage power supply 33 is actuated and controlled by pulse control circuit 72. The sustainer capacitor 70, for example, may be charged through a conventional choke and diode arrangement (not shown).

In the event it is not desired to use a capacitor such as capacitor 70, control circuit 72 or a separate control circuit may be provided for suitably controlling the sustainer power supply 49 to supply to electrodes 41 and 42 a pulsed sustainer field having the desired parameters.

As may now be seen, in accordance with this embodiment of the invention, improved efficiency in the production of the product mixture may be realized by maximizing the residence time of electrons and minimizing the time of negative and positive ions in the incoming feed stream. The electrons extract energy from the sustainer field and impart this energy to the incoming feed stream in the form of desired molecular excitation and dissociation.

Apparatus in accordance with the preceding discussion is preferably arranged and adapted so that the incoming feed stream receives energy from the sustainer field substantially only when the electron component of the current in the working region preferably greatly exceeds the ion component of the current.

For a further discussion, reference is made to U.S. Pat. No. 3,883,413, issued May 13, 1975, which is incorporated by reference as if set out at length herein.

In addition to providing a simple and efficient mechanism for providing the necessary reactions and processes to effect deuterium enrichment in the product mixture exiting from the electron beam-sustainer deuterium reactor, the use of this reactor has the added significant advantages of permitting selection of a wide range, for example, of volumes, pressure and/or vibrational excitation to optimize the production of the disclosed product mixture.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In a method of separating deuterium from a gaseous feed stream of mixed hydrogen and deuterium, the steps comprising:
    (a) combining said feed stream with gaseous bromine to form a first mixture and exposing said first mixture in a reaction zone to an electrical discharge formed by simultaneously introducing an electron beam into said reaction zone and applying an electric field across said reaction zone effective to produce deuterium bromide and hydrogen bromide with a ratio of D/H greater than the ratio of D/H in said feed stream;
    (b) separating at least a portion of said deuterium bromide and hydrogen bromide from said feed stream;
    (c) reacting said separated deuterium bromide and hydrogen bromide with a reactant to form a bromine reactant product and chemically separate the bromine from said separated deuterium bromide and hydrogen bromide; and
    (d) physically separating the bromine reactant product to leave a residue enriched in deuterium.

2. A method as in claim 1 wherein:
the purity, temperature, pressure, composition and residence time of said mixture of the feed stream and bromine in said reaction zone, and the electron beam and electric field are selected to produce said deuterium bromide and said hydrogen bromide with said ratio of D/H greater than the ratio of D/H in said feed stream.

3. A method as in claim 1 wherein:
    (a) said mixture of the feed stream and bromine are caused to continuously flow through said reaction zone including said electron beam and electric field; and
    (b) said bromine comprises about 0.1 to 1.0% of the flow through said reaction zone.

4. A method as in claim 3 wherein:
    (a) the pressure in said reaction zone is maintained in the range of about 0.1 to 2.0 atmospheres; and
    (b) the temperature at the exit of said reaction zone is maintained in the range of about 70° to 300° K.

5. A method as in claim 4 wherein:
impurities in said mixture are less than about one hundred parts per million and the impurities in said bromine are less than about one percent.

6. A method as in claim 1 wherein:
    (a) said electron beam is introduced into said reaction zone in short pulses; and
    (b) said electric field is reduced after each electron beam pulse until the next electron beam pulse.

7. A method as in claim 6 wherein:
the current flow of said electrical discharge comprises an electron component and an ion component and the length of said electron beam pulses and the rate of reduction of said electric field are selected to substantially provide an energy transfer to said feed stream from said electrical discharge by said electron component substantially greater than energy transfer by said ion component.

8. A method as in claim 7 wherein:
the majority of the total energy transferred to said feed stream by said electrical discharge is transferred by said electron component of said current flow and the magnitude of said electric field is selected to substantially maximize the formation of deuterium bromide in said reaction zone.

9. A method as in claim 1 wherein:
    (a) said electron beam is introduced into said reaction zone in short pulses;
    (b) said electric field is applied across said reaction zone in short pulses to produce said electric discharge having a pulsed current flow comprising an electron component and an ion component; and
    (c) said electron beam pulses and electric field pulses are selected to substantially maximize the residence time of said electron component in said feed stream and minimize the residence time of said ion component in said feed stream.

10. In a method of separating deuterium from a gaseous feed stream of mixed hydrogen and deuterium, the steps comprising:
    (a) combining said feed stream with gaseous bromine to form a first mixture and exposing said first mixture in a reaction zone to an electrical discharge formed by simultaneously introducing an electron beam into said reaction zone and applying an electric field across said reaction zone effective to produce deuterium bromide and hydrogen bromide with a ratio of D/H greater than the ratio of D/H in said feed stream;
    (b) separating at least a portion of said deuterium and hydrogen bromide from said first mixture by dissolving said deuterium bromide and hydrogen bromide in water;
    (c) reacting the said deuterium bromide and hydrogen bromide in said water with oxygen to form a second mixture of oxygen, bromine, water including deuterium enriched water, and HDO;
    (d) separating from said second mixture said bromine and said water including said deuterium enriched water to form a third mixture comprising said bromine and said water including said deuterium enriched water; and
    (e) separating said water including said deuterium enriched water from said third mixture.

11. A method as in claim 10 wherein:
said bromine remaining after said water including deuterium enriched water is separated from said third mixture, is supplied to and comprises at least part of the said gaseous bromine in said first mixture supplied to said reaction zone and said remaining water including deuterium enriched water at least in part is supplied to and comprises at least a portion of said water used to separate said deuterium bromide and hydrogen bromide from said first mixture.

12. A method as in claim 11 wherein:
the said oxygen forming part of said second mixture is at least in part separated therefrom and is supplied to and comprises at least a portion of the oxygen with which said deuterium bromide and hydrogen bromide is reacted.

13. In a method of separating deuterium from a gaseous feed stream of mixed hydrogen and deuterium, the steps comprising:
    (a) exposing said feed stream with gaseous bromine to an electrical discharge to form deuterium bromide and hydrogen bromide with a ratio of D/H greater than the ratio of D/H in said feed stream; and
    (b) separating at least a portion of said hydrogen bromide and deuterium bromide from said mixture.

14. A method as in claim 13 and additionally including:
   separating the bromine from said deuterium bromide and hydrogen bromide.

15. A method as in claim 14 wherein:
   (a) said deuterium bromide and hydrogen bromide are reacted with a reactant to chemically separate the bromine from said deuterium bromide and hydrogen bromide; and
   (b) physically separating the bromine reactant product to leave a residue enriched in deuterium.

16. In a method of separating deuterium from a gaseous feed stream of mixed hydrogen and deuterium, the steps comprising:
   (a) exposing said feed stream with gaseous bromine to an electrical discharge to form deuterium bromide and hydrogen bromide with a ratio of D/H greater than the ratio of D/H in said feed stream;
   (b) separating at least a portion of said deuterium bromide and hydrogen bromide from said mixture by dissolving said deuterium bromide and hydrogen bromide in water;
   (c) reacting the said deuterium bromide and hydrogen bromide in said water with oxygen to form bromine and deuterium enriched water; and
   (d) separating the bromine reactant product from said enriched water.

* * * * *

UNITED STATES PATENT AND TRADEMARK OFFICE
CERTIFICATE OF CORRECTION

PATENT NO. : 4,092,405

DATED : May 30, 1978

INVENTOR(S) : Charles W. von Rosenberg, Jr.; James J. Ewing; Robert E. Center and Hao-Lin Chen It is certified that error appears in the above-identified patent and that said Letters Patent are hereby corrected as shown below:

Column 8, line 62, cancel "of" (second occurrence) and insert therefor --or--; and Column 9, line 25, cancel ">" and insert therefor -- → --.

Signed and Sealed this

Fourteenth Day of November 1978

[SEAL]

Attest:

RUTH C. MASON
Attesting Officer

DONALD W. BANNER
Commissioner of Patents and Trademarks